May 18, 1948.  S. D. ROBERTSON  2,441,598
WAVE TRANSMISSION
Filed June 16, 1944   6 Sheets-Sheet 1

INVENTOR
S. D. ROBERTSON
BY
*N. S. Ewing*
ATTORNEY

May 18, 1948.  S. D. ROBERTSON  2,441,598
WAVE TRANSMISSION
Filed June 16, 1944  6 Sheets-Sheet 3

INVENTOR
S. D. ROBERTSON
BY
*N. S. Ewing*
ATTORNEY

May 18, 1948.    S. D. ROBERTSON    2,441,598
WAVE TRANSMISSION
Filed June 16, 1944    6 Sheets-Sheet 4

INVENTOR
S. D. ROBERTSON
BY
N. A. Ewing
ATTORNEY

May 18, 1948.  S. D. ROBERTSON  2,441,598
WAVE TRANSMISSION
Filed June 16, 1944  6 Sheets-Sheet 5

INVENTOR
S. D. ROBERTSON
BY
N. D. Ewing
ATTORNEY

May 18, 1948.  S. D. ROBERTSON  2,441,598
WAVE TRANSMISSION
Filed June 16, 1944    6 Sheets-Sheet 6

INVENTOR
S. D. ROBERTSON
BY
ATTORNEY.

Patented May 18, 1948

2,441,598

UNITED STATES PATENT OFFICE 2,441,598

WAVE TRANSMISSION

Sloan D. Robertson, Red Bank, N. J., assignor to Bell Telephone Laboratories, Incorporated, New York, N. Y., a corporation of New York Application June 16, 1944, Serial No. 540,588

37 Claims. (Cl. 179—171.5)

This invention relates to the transmission of electromagnetic waves and more particularly to microwave signaling systems.

One of the objects of the present invention is to improve microwave modulation systems of the novel type disclosed and claimed in the copending application of G. C. Southworth, Serial No. 540,670, filed of even date herewith, and more especially to simplify the construction of such modulation systems and to increase the effectiveness with which the available microwave power is utilized therein. One of the more general objects of the invention is to increase the effectiveness with which guided electromagnetic waves can be controllably varied.

The Southworth application to which reference has been made discloses a microwave modulation system of a kind in which a local source provides the high frequency carrier or beating oscillations and in which the latter are intermodulated either with locally supplied low frequency modulating waves or "signals" to produce high frequency signal-modulated or sideband waves for transmission to a distance, or with high frequency signal-modulated or sideband waves received from a distance to derive low frequency waves or signals therefrom. In one aspect the system involves a form of balanced, or carrier-suppressing modulation circuit, a self-shielded microwave guiding structure, and a peculiar and intimate correlation between the geometry and electrical properties of the modulation circuit on the one hand and the geometry and electromagnetic properties of the guiding structure on the other. Several distinct advantages are secured. For one, the carrier wave power is prevented, by virtue of a polarization-selective property of the microwave transmission path that is traversed by the sideband waves, from escaping freely through that path. Somewhat similarly, the sideband wave power is prevented from affecting the source of beating oscillations or from dissipating itself in the microwave transmission path connected thereto.

In accordance with a feature of the present invention as embodied in microwave modulation systems hereinafter to be described in detail, a separation is maintained between the point at which carrier or sideband waves are rejected by virtue of their polarization, and the position of the portion of the modulation circuit that excites, or that is excited by, the particular waves. Thus, carrier waves or received sideband waves may thereby be more effectively impressed on the modulation circuit, or sideband waves generated in the modulation circuit may be more effectively impressed on the sideband transmission path. In certain embodiments the two circuit portions are spaced apart, and in other embodiments the points of rejection are spaced apart. In either of these cases the separation may be made optimum for either or both of the two waves.

In accordance with a related feature a hollow conductively bounded chamber accommodates at least the two aforesaid portions of the modulation circuit, and the transmission paths individual to the two microwaves involved in the modulation process are individually coupled or connected to the chamber.

Another feature of the present invention is a balanced modulation system of the kind described utilizing only a pair of non-linear or modulating elements.

Still another feature lies in a modulation system in which the said modulating elements are disposed in an electrically and mechanically advantageous position outside the confines of the microwave guiding structure.

The nature of the present invention and its various features, objects and advantages will appear more fully from a consideration of the embodiments illustrated in the accompanying drawings. In the drawings.

Figure 1:
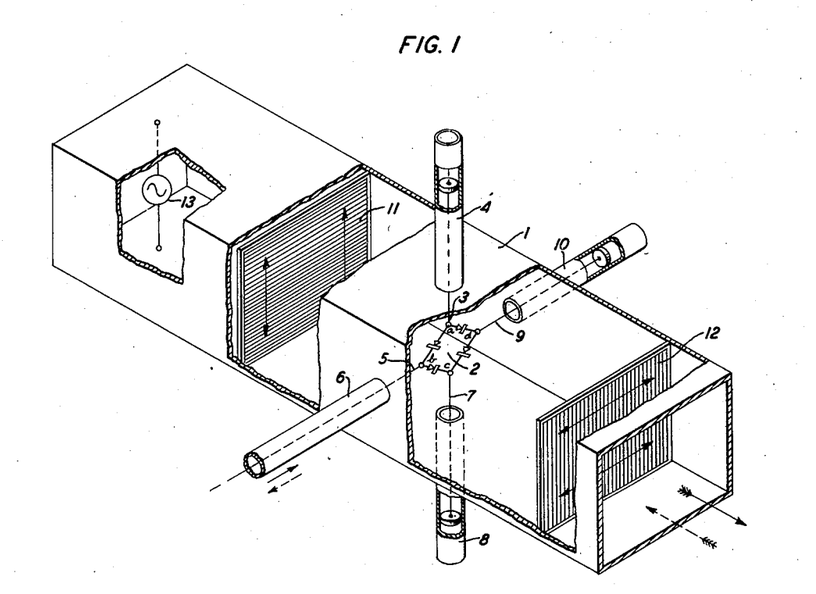
Fig. 1 illustrates a modulation system in accordance with the invention.

Referring more particularly now to the modulation system represented in Fig. 1, there is shown a hollow pipe guide 1 of rectangular or, specifically, square cross-section which may contain air or any other low-loss dielectric medium. A wave guide of this character, comprising a single conductor in the form of a tube, is intended by the term "tubular uniconductor guide" employed hereinafter. Disposed substantially centrally within the guide 1 is a bridge 2 comprising four electrovariable impedance elements connected in the manner shown. From terminal $a$ of bridge 2 a conductor 3 extends, perpendicularly to the upper face of guide 1, through an opening in the upper face, continuing outside the guide as the inner conductor of a coaxial conductor tuner 4, From the other bridge terminals $b$, $c$, $d$, respective conductors 5, 7, 9, extend similarly out through openings in the other walls of the guide to individual coaxial tuners 6, 8 and 10.

Within the guide 1 and to the left of bridge 2 is a grating 11 that is substantially transparent to incident guided waves that are vertically polarized but that constitutes a substantially perfect reflector of incident guided waves having horizontal polarization. Similarly disposed on the other side of bridge 2 is a grating 12 that is transparent to horizontally polarized waves and that is a substantially perfect reflector of vertically polarized waves. Grating 11 may comprise, for example, a multiplicity of fine conducting wires disposed horizontally one above the other in a transverse plane. Grating 12 may be similarly constituted except that in this case the wires are vertical.

To the left of grating 11 and within the closed end of guide 1 is a device 13 for supplying beating oscillations to the bridge 2. The oscillations are transmitted through the guide 1 in the form of guided waves of the dominant type having lines of electromotive force parallel with the vertical faces of the guide. These vertically polarized beating or carrier waves pass substantially unimpeded through grating 11 and impress themselves on the vertical conductors 3 and 7 thereby developing an alternating difference of potential across bridge terminals $a$ and $c$. Normally the bridge 2 is electrically balanced so that bridge terminals $b$ and $d$ are equipotential points. The signal to be impressed on the oscillations is concurrently applied to the bridge 2, by means to be described, to produce a continually varying degree of unbalance of the bridge. The result from one point of view, is that the signal and beating oscillations are intermodulated, the several modulation products appearing as a varying potential difference across bridge terminals $b$ and $d$. These products include upper and lower signal sidebands corresponding in frequency to the sum and difference, respectively, of the signal and beating frequencies. The sideband voltages thus derived are communicated to conductors 5 and 9 which launch corresponding horizontally polarized waves of dominant type in guide 1. These waves proceed unimpeded through grating 12 to a distant receiver or other utilization means not shown.

Whereas grating 12 allows the horizontally polarized sideband waves to pass, it reflects substantially completely any vertically polarized carrier wave incident on it. Except for the grating 12 some of the carrier wave power, failing to be effectively impressed on the bridge 2, would escape to the right through guide 1. Such waves are reflected, however, and return toward bridge 2, and by properly adjusting the longitudinal position of grating 12 in the guide 1 the carrier wave may be applied with maximum effectiveness to the bridge. The tuning of coaxial tuners 4 and 8 may be concurrently adjusted with the same end in view. Somewhat similarly the horizontally polarized sideband waves that are propagated to the left from conductors 5 and 9 are substantially completely reflected by grating 11 and are transmitted in the desired direction to the right through guide 1. The spacing between grating 11 and bridge 2 and the tuning of coaxial tuners 6 and 10 may be concurrently adjusted to secure a maximum of transmitted sideband power. In general, the purpose and effect of the adjustments is to secure an impedance match between the source of beating oscillations and bridge 2 and also, with respect to the sideband frequency, an impedance match between bridge 2 and the portion of guide 1 extending to the right. The optimum spacing between each reflector and the bridge will be found to be approximately one-quarter wavelength or other odd multiple thereof. More particularly, reflector 11 may be spaced from the bridge a quarter of the wavelength of whichever of the sidebands it may be desired to favor, and reflector 12 may be spaced from the bridge a quarter of the wavelength of the guided carrier wave.

Although the Fig. 1 system has been described with reference to the modulation of a carrier wave with signals to be transmitted, the system is adapted also, like the others herein disclosed, for the reciprocal modulation process in which signals are recovered from received signal-modulated waves. In the latter case the signal-modulated waves received from the right are horizontally polarized. They pass through grating 12 into the chamber bounded by the two gratings and are impressed on the transverse conductors 5 and 9. As a result of intermodulation with the locally supplied beating oscillations from source 13, the signals appear across bridge terminals $b$, $d$ and are taken off by means to be described. The receiving system need differ from the transmitting system only in the substitution of a signal receiver for the signal source.

Figure 2:
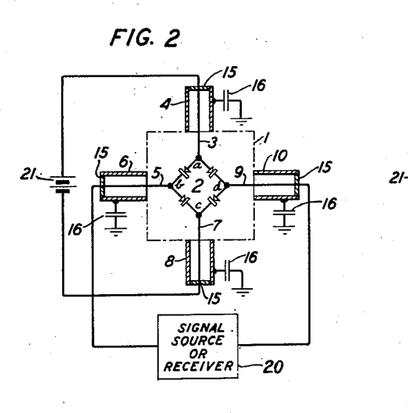
Figs. 2 and 3 are circuit diagrams relevant to Fig. 1.
Figure 9:
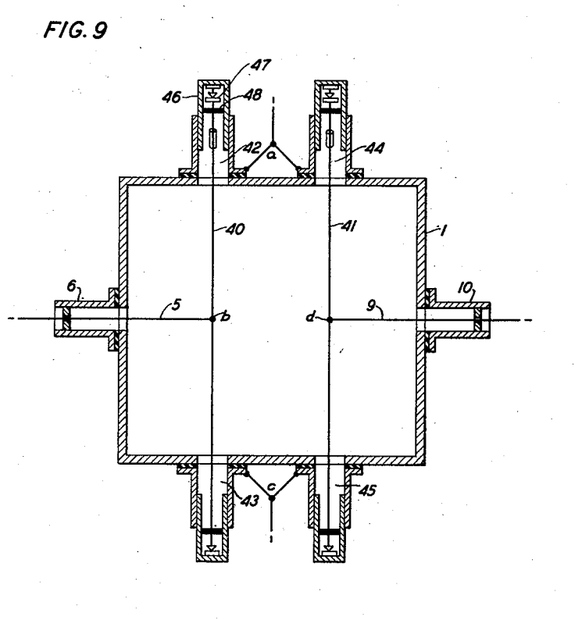

Further circuit details appropriate for the Fig. 1 system are illustrated schematically in Fig. 2. Considering first the four coaxial tuners, each comprises a conductive short-circuiting piston 15 that slides within the outer conductor of the coaxial pair. The position of the piston 15 affects the reactance presented at the open end of the tuner. The four by-pass condensers 16 in Fig. 2 signify that the outer conductor of each coaxial tuner is insulated from the wall of guide 1. As illustrated in Fig. 9, for example, an insulating washer may be interposed between the pipe wall and a conductive flange surmounting the end of the outer conductor. The signal circuit, comprising signal source or receiver 20, may then be connected to the two coaxial tuners 6 and 10 as shown in Fig. 2, and through the tuners to the bridge terminals $b$ and $d$. The capacitances 16 associated with tuners 6 and 10 effectively by-pass the waves supported in the guide but they are not so large as to substantially short-circuit the signal circuit.

The impedance elements comprising bridge 2 have been referred to as electrovariable, signifying that the impedance of each is variable and more especially that it is markedly dependent on the electric current passing through the element. The elements may be such non-ohmic or non-linear elements as crystals of silicon, galena or iron pyrites. The crystals are asymmetrically conducting and they are poled, as indicated in the drawing, so that maximum current conduction occurs from $a$ to $b$, $a$ to $d$, $b$ to $c$ and $d$ to $c$. The modulation effect produced by bridge 2 can be modified and generally enhanced by electrically biasing the crystals comprising the bridge. For this purpose a unidirectional biasing voltage source 21 is connected to bridge terminals $a$ and $c$ by way of coaxial tuners 4 and 8. The capacitances 16 associated with the latter prevent short-circuiting of the source 21. The most favorable biasing voltage depends on various operating conditions including the relative amounts of signal and carrier power impressed on the crystals, but in any particular case one may adjust the biasing voltage until the measured sideband power is maximum.

Figure 3:
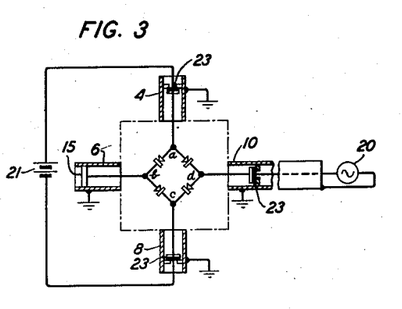

In the modification illustrated schematically in Fig. 3, the coaxial tuner pistons 23 are of a well-known composite type comprising parts that are insulated from each other to prevent short-circuiting of the coaxial conductors, so far as concerns biasing or signal voltages, while effecting substantially complete reflection of high frequencies. In this case the outer conductors of the coaxial tuners may all be conductively connected to the walls of the guide 1, and the external circuits comprising elements 20 and 21 may then be connected to the inner conductors of the several coaxial tuners. If tuner 6 has a conductive piston 15 of the type previously described the source or receiver 20 may be connected across the inner and outer conductors of coaxial tuner 10 as illustrated in Fig. 3, thus permitting complete shielding of the signal circuit. As a specific example of practice the frequency of the beating oscillations or carrier waves may be 3,000 megacycles and the signals may be in the form of a speech-modulated 30-megacycle wave. The frequency of the lower sideband in such case is about 2,970 megacycles and that of the upper about 3,030 megacycles.

It will be understood that in a balanced modulation circuit such as shown in Figs. 2 and 3 the terminal pair $ac$ and the conductor 3—7 on the one hand and the terminal pair $bd$ and the conductor 5—9 on the other hand, are in a sense in conjugate circuit relation with each other. That is, beating oscillations impressed on conductor 3—7, for example, do not give rise to corresponding oscillations in conductor 5—9, although modulated oscillations, i. e., sideband currents may appear in the latter. Likewise, sideband currents induced in conductor 5—9 by an incident guided wave do not give rise to corresponding currents in conductor 3—7.

Figure 4:
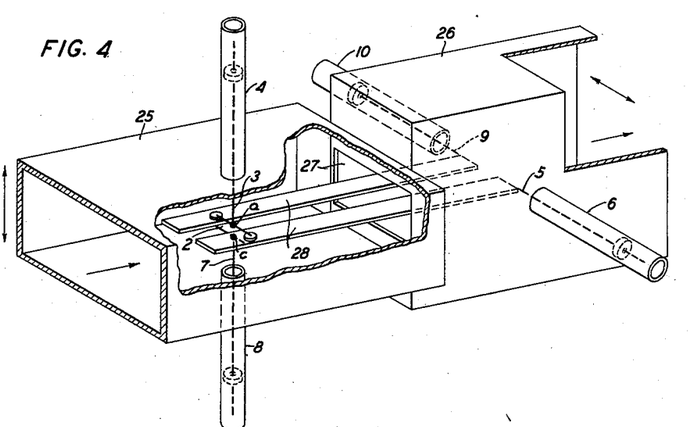
Figs. 4 to 12 illustrate other modifications of the invention.

Fig. 4 illustrates another form of modulation system in accordance with this invention in which, as in the Fig. 1 system, polarity-selective wave reflection and longitudinal spacing of the parts contribute to effective utilization of the available high frequency wave power. In this modification two hollow pipe guides 25 and 26 of elongated rectangular cross-section are disposed end to end in abutting relation with their longer transverse dimensions at right angles to each other. At their junction the exposed ends of the two guides are closed, leaving within a rectangular opening 27 between the two guides. A pair of strip-like conductors 28 disposed side by side in the horizontal median plane extend longitudinally through the opening 27. At or near the left-hand end of the conductor pair 28 is the bridge circuit 2, the $b$ and $d$ terminals thereof being connected respectively to the two conductors 28. The $a$ and $c$ terminals of the bridge are connected to vertical conductors 3 and 7, respectively, and their respective coaxial tuners 4 and 8. The rectifying crystals may be affixed to the conductors 28, two on the upper faces thereof and two on the lower faces, as illustrated in Fig. 4. Horizontal conductors 5 and 9 and their associated coaxial tuners 6 and 10 are connected to the respective conductors of pair 28 at the right-hand end thereof.

Vertically polarized carrier waves from the source 13, not shown in this figure, pass to the right through guide 25 and impress themselves on the vertical conductors 3 and 7. The signals to be transmitted are concurrently applied to the conductors 5 and 9 in either of the manners described with reference to Figs. 2 and 3 and they are conveyed through conductors 28 to bridge terminals $b$ and $d$. The sidebands generated in bridge circuit 2 are transmitted through conductor pair 28 to conductors 5 and 9, and from the latter horizontally polarized signal-modulated waves are launched in the guide 26.

The transmission cut-off characteristic of the hollow pipe guide is utilized in the Fig. 4 system to obtain polarity-selective wave reflection. More particularly, the horizontal transverse dimension of guide 26 is made sufficiently small in relation to the frequency of the beating oscillations that the guide 26 is incapable of transmitting vertically polarized waves of this frequency. Hence the vertically polarized carrier waves passing through guide 25 are reflected at or near opening 27 and return toward the bridge circuit 2. The distance from the latter to the reflection point is so fixed or adjusted as to substantially match the impedance of guide 25 with the impedance that is presented to the beating oscillations by the bridge circuit. Coaxial tuners 4 and 8 may be adjusted to facilitate the impedance match. The vertical dimension of guide 25 is likewise so restricted as to prevent transmission of the horizontally polarized sideband waves, and the position of conductors 5 and 9 longitudinally of the guide is similarly so fixed or adjusted that a maximum of the available sideband wave power is transmitted to the right through guide 26.

Figure 5:
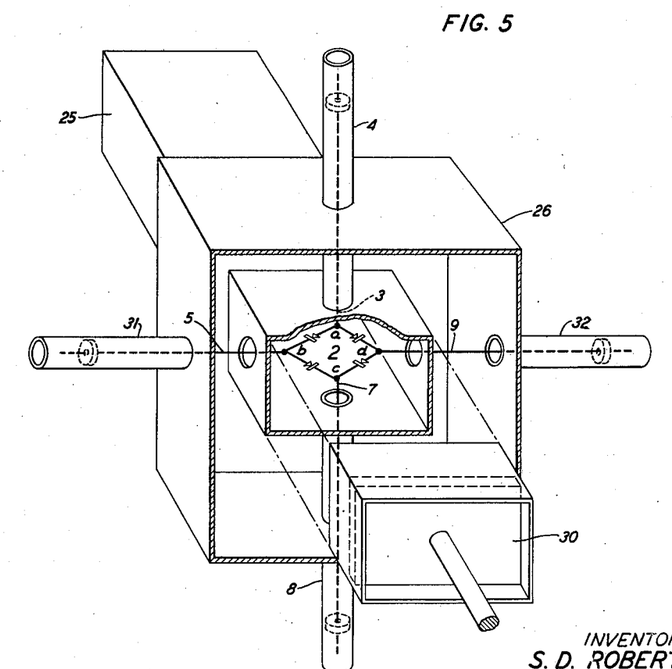

Certain features of the present invention are embodied also in the modulator illustrated in Fig. 5. Here the hollow pipe guide 25 which supplies the beating oscillations projects into the closed end of a larger guide 26 of rectangular cross-section. The inwardly projecting end of guide 25 is closed by a longitudinally adjustable reflecting piston 30. Bridge 2 is disposed within the inwardly extending portion of guide 25. The bridge terminals $a$ and $c$ are connected as in previous examples to vertical conductors 3 and 7, and these are associated with coaxial tuners 4 and 8 that project out through the upper and lower faces of guide 26. The horizontal conductors 5 and 9 extend from bridge terminals $b$ and $d$ out through openings in the vertical faces of guide 25 to the vertical faces of guide 26 where they continue as the inner conductors of coaxial conductor tuners 31 and 32, respectively.

Vertically polarized carrier waves supplied through guide 25 are impressed on the vertical conductors 3 and 7, and a substantial impedance match is effected by concurrent adjustment of piston 30 and coaxial tuners 4 and 8. The sideband currents appearing in conductors 5 and 9 excite horizontally polarized sideband waves in guide 26, and the spacing of these conductors from the closed end of guide 26 is so fixed or adjusted as to effect a maximum transfer of sideband power to that guide. Coaxial tuners 31 and 32 are adjusted with the same end in view. The vertical dimension of guide 25 may be restricted so that transmission of horizontally polarized sideband waves in the guide 25 is substantially precluded, thereby preventing dissipation of the sideband power in the beating oscillation source. There is little tendency for the vertically polarized carrier waves to escape through the lateral openings in guide 25, and therefore little loss of carrier wave power to the guide 26, for the diameter of these openings is small compared with the wavelength and the electric field intensity of the carrier wave is substantially zero at the lateral walls.

Figure 6:
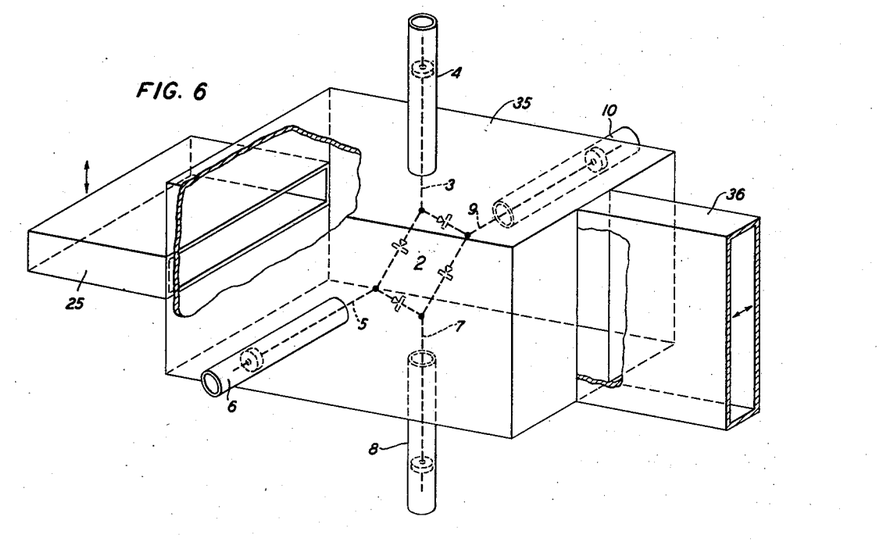

Fig. 6 illustrates a modulation system that is substantially the same as the one described with reference to Fig. 1 except for the polarity-selective reflecting means employed. In Fig. 6 the transverse dimensions of the chamber, or guide section 35 are made large enough that both the vertically polarized beating waves and the horizontally polarized sideband waves can be sustained therein. Hollow pipe guide 25, which supplies vertically polarized beating waves, opens into the closed left-hand end of chamber 35 and its vertical dimension is so restricted that horizontally polarized sideband waves are reflected from its end much as they are reflected from the grating 11 in Fig. 1. Guide 36 is connected to the right-hand end of chamber 35, and its horizontal dimension is made small enough that the vertically polarized beating waves are reflected at or near its end substantially as they are reflected from the grating 12 in Fig. 1. The various parts are adjusted and dimensioned in the manner and for the purposes described with reference to Fig. 1.

Figure 7:
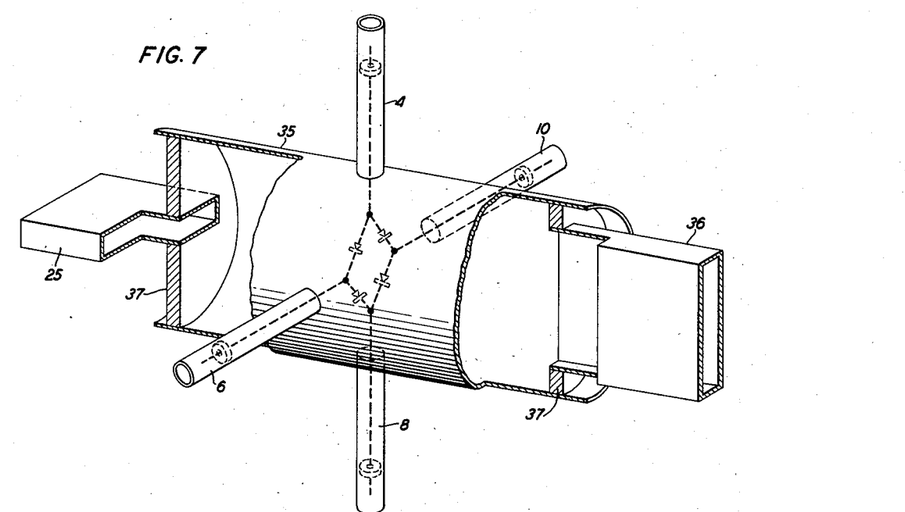

The modulation chamber 35 may alternatively be of circular cross-section, as illustrated in Fig. 7, in which case the end walls 37 of the chamber 35 may be constructed as pistons adapted for both longitudinal and rotational movement. Any of several known means may be employed to insure an electrically tight fit of the pistons 37. The rotational adjustment can be utilized to suppress any vestige of the carrier wave that may appear in guide 36, or of the sideband waves that may appear in guide 25.

Figure 8:
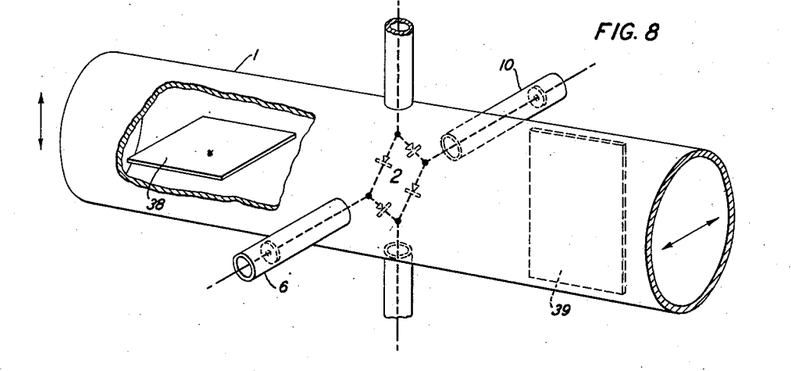

In the modification of the Fig. 1 system that is illustrated in Fig. 8, the hollow pipe guide 1 is of circular cross-section, and in lieu of the gratings 11 and 12 conductive septa 38 and 39 are employed. Septum 38 is disposed in the horizontal axial plane and septum 39 in the vertical axial plane, and both may be approximately a half wavelength long. Septum 38 presents substantially no impedance to vertically polarized ($H_{11}$) carrier waves supplied from the left-hand end of the guide but it substantially completely reflects horizontally polarized sideband waves originating at bridge 2. Septum 39 allows the horizontally polarized sideband waves to pass but it reflects any of the unmodulated vertically polarized carrier wave incident upon it from the left. The several parts are positioned and adjusted in the manner previously described.

In some instances in practice it may be necessary or desirable to transmit only one of the sidebands. It is noted therefore that one of the sidebands, viz., the lower sideband, can be readily suppressed in the modulation systems illustrated in Figs. 1, 4, 6 and 7 by so restricting the appropriate transverse dimension of the outgoing guide or section of guide that the transmission cut-off frequency thereof lies between the two sidebands. Unnecessary dissipation of wave power in the form of a lower sideband is thereby largely avoided.

Although the variable impedance elements comprising the bridge 2 may be disposed within the guide, as illustrated in Fig. 1 and other figures, the size of the guide may be so small in some cases as to make it inconvenient, if not impossible, to accommodate the variable elements within the guide itself. This difficulty is avoided and other important advantages are secured in accordance with further features of the invention that are incorporated in certain alternative arrangements that are specifically adapted for guides 1, 25 or chambers 35 of rectangular cross-section and that are illustrated in Figs. 9 to 12.

In Fig. 9 the horizontal transverse conductors 5 and 9 and their respective coaxial tuners 6 and 10 are arranged in the manner described with reference to Figs. 1 and 2. Disposed in the same transverse plane are two vertical conductors 40 and 41, the mid-points of which are connected to the inner ends of conductors 5 and 9, respectively, at points $b$ and $d$. Conductor 40 is terminated at both extremities by coaxial conductor tuners 42 and 43, and conductor 41 similarly extends in both directions through the horizontal faces of guide 1 to continue as the inner conductor of coaxial tuners 44 and 45.

The several coaxial tuners 42 to 45 may take the specific form illustrated in which the inner and outer conductors are both telescopically adjustable and separable, one of the removable portions comprising a cylindrical cup 46 closed at its outer end. In each of these tuners a crystal 47 is interposed in the inner conductor, all of the crystals being poled in the same vertical direction as shown. Each crystal 47 may be supported on the closed end of the tuner portion 46 or slightly spaced therefrom and otherwise supported as by means of an insulating disc 48. The outer conductors of tuners 42 and 44 are electrically insulated from the pipe 1 as hereinbefore specified and they are electrically joined to provide a bridge terminal $a$. Tuners 43 and 45 are similarly insulated and joined to provide a bridge terminal $c$. The external circuit connections are substantially as shown in Fig. 2, terminals $a$ and $c$ being connected to a biasing source 21 and the coaxial tuners 6 and 10 being connected to a signal source or receiver 20. It will be evident that the vertically polarized carrier waves incident on conductors 40 and 41 give rise to corresponding currents that flow through the several crystals in the same relative phase, or, in other words, the crystals are so poled that the relative direction in which the carrier current flows through them at a given instant, whether in the direction of maximum conduction or the reverse, is the same for all of them. This relative phase obtains also in Fig. 2, of course, where the carrier is impressed across bridge terminals $ac$. The low frequency signal, since it is applied across terminals $bd$, passes through the crystals in tuners 42 and 45 in the same relative phase, and through the other pair of crystals in the opposite relative phase. As in any modulation circuit of this character, then, the generated sideband currents have the same phase or direction, relative to the poling of the crystals, in tuners 42 and 45, and the opposite phase or direction in tuners 43 and 44. The result is that any sideband current flowing in the upper half of conductor 40 is matched by sideband current of opposite phase or direction in the lower half of conductor 40 (or in the upper half of conductor 41). However the four conductor halves be paired, it will be seen that the sideband currents therein afford no net excitation for vertically polarized sideband waves in the guide 1. On the other hand, the sideband current components in conductors 5 and 9 are all in like phase for the excitation of the desired horizontally polarized sideband waves in guide 1.

In considering the circuit and phase relations that obtain in Fig. 9 it may be helpful to note that the crystals interposed in one of the vertical conductors, say conductor 40, are connected effectively in series relation with each other to the carrier transmission path, and that they are connected via conductor 5 effectively in parallel with each other to the sideband transmission path. These same relations, series and parallel, will be found in other figures also.

One of the advantages of the construction described with reference to Fig. 9 is the ease with which the crystals 47 may be removed for testing or replacement. Another is that each of the crystals is associated with an individual tuner thereby making it possible to compensate, by tuning, for slight dissimilarities in the several crystals and facilitating suppression of the unwanted carrier wave component.

Figures 10, 10A, 11, 14:
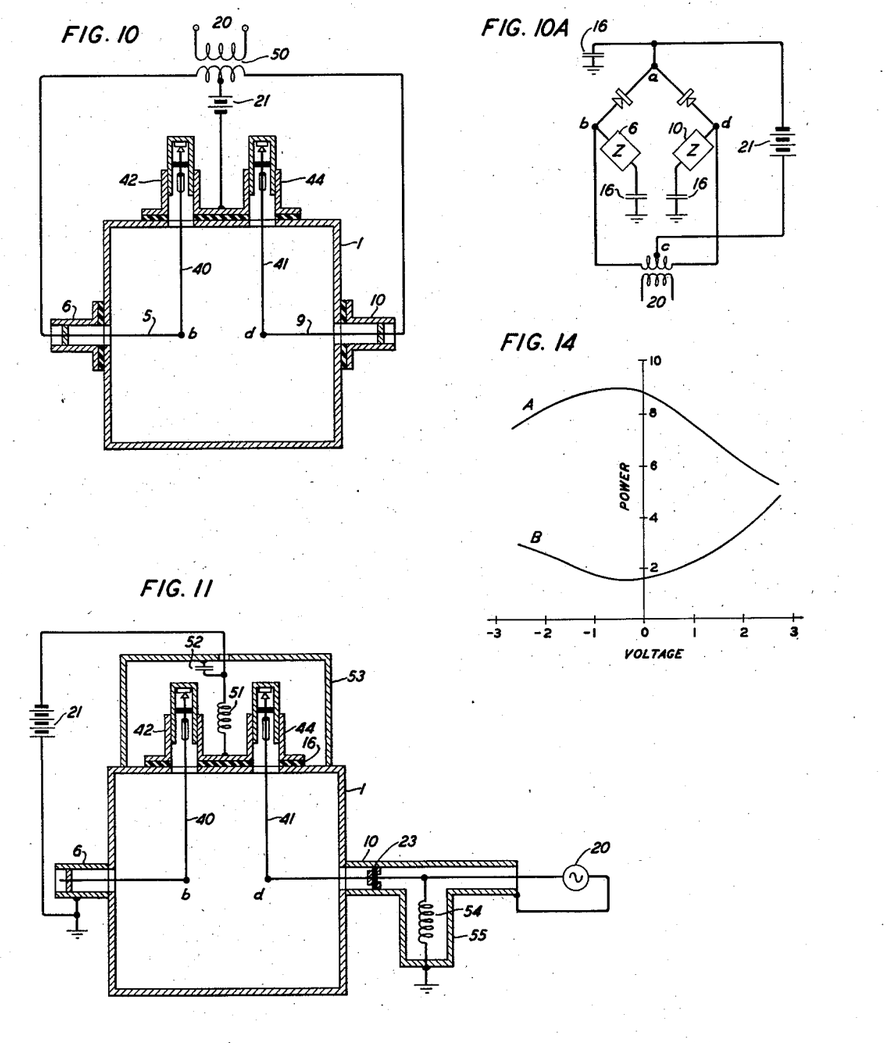
Fig. 14 is a graph depicting certain characteristics of the modulating elements employed.

Fig. 10 illustrates a modified arrangement as compared with Fig. 9, and Fig. 10A depicts what is substantially the equivalent circuit thereof. Only a single pair of crystals are employed in this modification, and these are mounted at the closed end of coaxial tuners 42 and 44. The coaxial tuners 43 and 45 of Fig. 9 are omitted, as well as the portions of conductors 40 and 41 that extend therefrom to the bridge terminals $b$ and $d$, respectively. The guided carrier wave is impressed on the conductor portions 40 and 41 that extend from these bridge terminals to the coaxial tuners 42 and 44, respectively. The low frequency or signal circuit 20 is connected through a balanced transformer 50 to the coaxial tuners 6 and 10, and the biasing source 21 is connected between the mid-point of the balanced transformer winding and coaxial tuners 42 and 44. In Fig. 10A the condensers 16 represent the various by-passing capacitances between the several coaxial tuners and the grounded pipe guide 1. It will be evident on consideration of the equivalent circuit that because of the effective reactances $z$, at the carrier frequency, of coaxial tuners 6 and 10, the points $b$ and $d$ are not at ground potential with respect to the carrier although they are equipotential points when the bridge circuit is balanced. Brief consideration of the phase relations obtaining in Fig. 10 will show that although carrier and sideband currents flow in each of the conductors 5—40 and 9—41, the carrier components in conductors 5 and 9 neutralize each other so far as excitation of horizontally polarized guided carrier waves is concerned, and that the generated sideband components in conductors 40 and 41 are always oppositely directed whereby excitation of vertically polarized guided side-band waves is avoided. A similar analysis applies, of course, in the case of reception of modulated or sideband waves.

Fig. 11 illustrates a further modification that is similar in outline to the arrangement shown in Fig. 10, but in which the low frequency circuit is associated with the bridge in substantially the manner described with reference to Fig. 3. In this embodiment the coaxial tuner 10 has a piston 23 of the capacitative type, and it is extended to form a coaxial line leading to the signal transceiver 20. The biasing source 21 is connected to the grounded coaxial tuner 6 and, through a choke coil 51, to insulated tuners 42 and 44. One side of choke coil 51 is connected through a by-pass condenser 52 to a grounded shield 53 which encloses the coil, the condenser and the coaxial tuners 42 and 44, thereby effectively isolating the signal and biasing circuits from each other and blocking escape of such wave effects as may be incompletely stopped by the by-pass capacitance 16. The biasing circuit is completed through a choke coil 54 which is connected between the inner and outer conductors of the coaxial line and housed in a shield 55 that opens into the outer conductor of the line.

Figure 12:
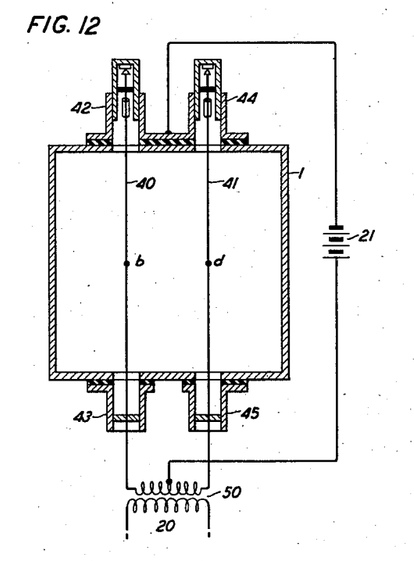
Figure 12A:
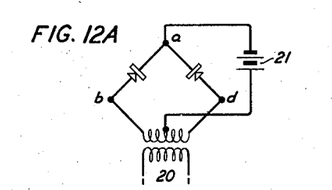
Figure 12B:
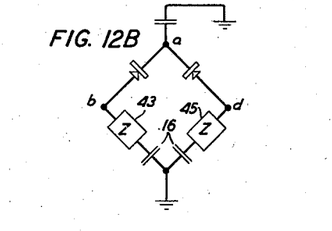

In the further modification of Fig. 9 that is illustrated in Fig. 12, the horizontal conductors 5 and 9 and their respective coaxial tuners are omitted. Coaxial tuners 43 and 45 are insulated from the pipe guide 1 and from each other, with respect to both signal and bias, and the crystals are omitted. The signal circuit is connected across coaxial tuners 43 and 45 through transformer 50, and the biasing source for the crystals in tuners 42 and 44 is connected to the latter tuners on the one hand and to the mid-point of the transformer winding on the other. Fig. 12A shows the equivalent circuit for the signal and biasing currents, and Fig. 12B is the equivalent circuit applicable to the high frequency or carrier currents.

When the bridge circuit in Fig. 12 is balanced, i. e., when no signal is applied, for example, the potentials of points $b$ and $d$ vary alike under the influence of the incident carrier wave. There is no potential difference between them, and the same is true of every other pair of points along the conductors 40 and 41. When the bridge becomes unbalanced, however, an alternating potential difference appears between points $b$ and $d$, and between other pairs of points along conductors 40, 41, with the result that excitation is provided for a horizontally polarized wave. Although the excitation conforms with the field configuration of various wave types in addition to the dominant type, all wave types other than the dominant one can be suppressed by so restricting the vertical transverse dimension of the guide 1 that only the desired wave can be sustained in the guide.

With regard to the crystals employed in the modulators disclosed herein, best results have been obtained with silicon crystals of medium impedance employing platinum-iridium or gold-dipped tungsten contact points. These crystals exhibited a direct current resistance in the direction of maximum conductivity of the order of 250 ohms, and in the opposite direction of conductivity a direct current resistance of the order of 1800 ohms. The behavior of the crystals will appear more fully from a consideration of Figs. 13 and 14.

Figure 13:
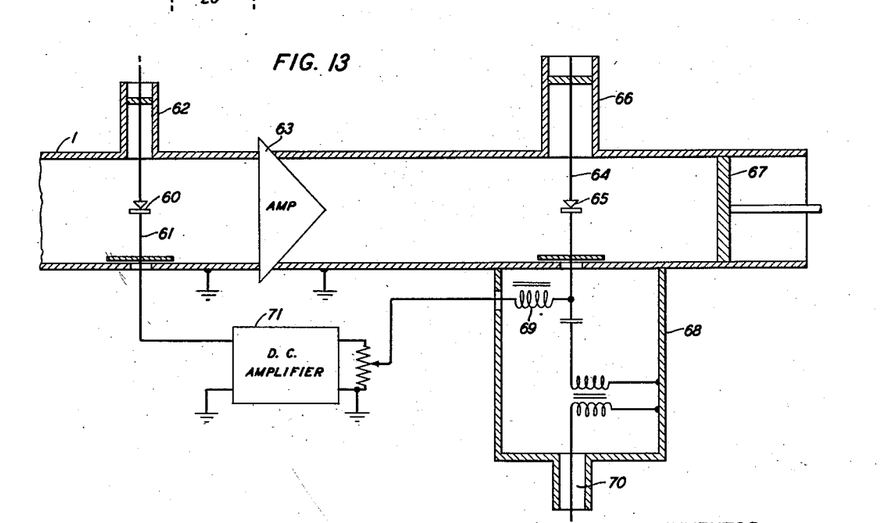
Fig. 13 illustrates a guided wave receiving system embodying certain features of the invention.

In Fig. 13 a crystal 60 of the kind described is interposed in a conductor 61 that extends across the interior of the hollow pipe guide 1. A coaxial tuner 62 is connected to one end of conductor 61, and the other end extends through a by-passed opening in the pipe wall to a biasing voltage source. The impedance of the crystal to radio-frequency currents depends on the sense and magnitude of the direct current bias; it is greatest when the bias is somewhat negative, i. e., when the biasing voltage is poled to oppose the passage of current in the direction of maximum conductivity, and it falls progressively as the magnitude of biasing voltage is changed in either direction from the aforementioned somewhat negative value. The effective shunt impedance presented by crystal 60 and conductor 61 to a wave passing through guide 1 is a function of the crystal impedance or bias, the adjustment of tuner 62 and the position of crystal 60 longitudinally of conductor 61. In turn, the amount of power that is absorbed from the passing guided wave 1 or caused to be reflected is a function of the relation of the effective shunt impedance to the characteristic impedance of the guide. It will be evident, therefore, that the amount of guided wave power that is allowed to pass the shunt circuit can be controlled at will by varying the biasing voltage.

It has been found that a reduction in crystal impedance, effected by changing the bias, may either increase or decrease the wave power transmitted past the shunt branch depending on the position of crystal along conductor 61. In one case in which the crystal 60 was aligned with the upper face of the guide, the transmitted wave power varied with biasing voltage in the manner shown by curve A of Fig. 14. With the crystal slightly nearer the center of the guide, curve B of Fig. 14 was obtained.

The properties illustrated in Fig. 14 are utilized in Fig. 13 to provide automatic signal volume compression or expansion in a signal receiving system. Signal-modulated waves received at the left are passed through guide 1 and an amplifier 63 to the transverse conductor 64 in which a crystal 65 is interposed. A coaxial tuner 66 connected to one end of conductor 64 and a wave guide piston 67 may be concurrently adjusted to impress a maximum of wave power on the crystal 65. Carrier or beating waves may accompany the received sidebands or be separately supplied. The signal recovered by intermodulation of the carrier and sidebands, and also the direct current component resulting therefrom, are conducted through a by-passed opening in the wall of the guide 1 to circuit elements within a shield 68. The signal is separated from the direct current component by means of a series condenser and it is then applied through an impedance-matching transformer to coaxial line 70.

The direct current component is taken off through a choke coil 69 and applied to the input of a direct current amplifier 71, the output of which is connected to serve as the biasing source for crystal 60. The biasing voltage so derived fluctuates in accordance with the variations in signal volume and produces corresponding changes in the effective impedance of crystal 60.

If crystal 60 be so positioned that curve A of Fig. 14 is applicable, an increase in the derived biasing voltage, whether positive or negative, reduces the amount of wave power passing beyond conductor 61 to amplifier 63. Hence, the Fig. 13 organization discriminates against strong signals thereby reducing the intensity range of the signals delivered through line 70 to the receiving equipment. If, on the other hand, conditions are such that curve B of Fig. 14 is applicable, the system will favor strong signals thereby exaggerating the variations in signal intensity appearing in the receiving equipment.

Although the present invention has been described with reference to specific embodiments thereof, it may be embodied in various other forms within the spirit and scope of the appended claims.

What is claimed is:

1. A combination comprising a conductively bounded chamber and including two electromagnetic wave translating means coupled to said chamber at respectively different points thereof spaced apart from each other, one of said translating means being transparent to and the other a reflector of waves having a first state of polarization, the other of said translating means being transparent to and the said one a reflector of waves having a second state of polarization, a first circuit means disposed within said chamber in transfer relation with said waves having said first state of polarization, a second circuit means disposed within said chamber in transfer relation with said waves having said second state of polarization, and variable impedance means coupling said first and second circuit means together.

2. A combination comprising a conductively bounded chamber and including polarization-selective means for admitting to said chamber electromagnetic waves having one state of polarization while reflecting waves having another state of polarization, polarization-selective means spaced from said first-mentioned means for taking from said chamber waves having said other state of polarization while reflecting waves having said one state of polarization, means within said chamber for converting waves from said one to said other state of polarization, and means operative on said converting means for controlling the degree of conversion of waves from the said one to the said other state of polarization.

3. A combination in accordance with claim 2 in which at least one of said polarization-selective means comprises a polarization-selective grating.

4. A combination in accordance with claim 2 in which at least one of said polarization-selective means comprises a tubular uniconductor wave guide.

5. A combination in accordance with claim 2 in which said connecting means comprises variable impedance means.

6. A guided electromagnetic wave transmission system comprising two wave transmission paths, means for transmitting waves having one state of polarization through one of said paths, means for converting said waves into waves having another state of polarization in the other of said paths, said one path comprising means for reflecting waves of said other state of polarization at a point spaced from said converting means, said other path comprising means for reflecting waves of said one state of polarization at another point spaced from said converting means, and electrical circuit means operative on said converting means for controllably varying the conversion effected thereby.

7. A conductively bounded electromagnetic wave transmission path comprising polarization-selective wave translating means for reflecting two differently polarized waves at respective different spaced points therein, and circuit means coupled to both of said waves at a point in said path intermediate said reflection points, said circuit means including a non-linear impedance element.

8. A modulation system comprising a conductively bounded chamber, two differently oriented transverse conductors within said chamber, means for impressing beating oscillations on one of said transverse conductors, non-linear impedance means interconnecting the two said conductors, means for deriving signal-modulated waves from the other of said transverse conductors comprising means for applying signal currents to said impedance means, and means for withdrawing the said signal-modulated waves from said chamber to the exclusion of said beating oscillations comprising polarization-selective wave translating means that is substantially transparent to said signal-modulated waves, said one conductor and said last-mentioned means being spaced apart from each other.

9. A modulation system comprising a conductively bounded chamber, means including a first polarization-selective wave translator for introducing into said chamber beating waves having a first state of polarization, circuit means within said chamber for receiving the said beating waves, a second polarization-selective wave translator spaced from said circuit means for reflecting the said beating waves, a transmission path carrying signal-modulated waves having a second state of polarization, means coupling said path to said chamber through said second wave translator, other circuit means within said chamber disposed in transfer relation with said signal-modulated waves, means spaced from said other circuit means and comprising said first wave translator for reflecting said signal-modulated waves, non-linear impedance means connecting the two said circuit means, and a signal circuit connected to said impedance means.

10. In combination, a conductively bounded wave transmission path, two circuit means disposed in said path, one of said circuit means being oriented in energy transfer relation with transmitted waves having a certain plane of polarization, and the other of said circuit means being oriented in energy transfer relation with transmitted waves having a conjugate plane of polarization, non-linear impedance means for coupling said two circuit means together, means for exciting said one circuit means comprising means for transmitting thereto through one portion of said path waves that have said certain plane of polarization and polarization selective means for reflecting the said transmitted waves from a point beyond said one circuit means, and means for enhancing energy transfer between said other circuit means and waves of said conjugate polarization in another portion of said path comprising polarization-selective means for reflecting said last-mentioned waves at a point in said path spaced from said other circuit means.

11. In a system of the kind described, a conductively bounded wave transmission path, and a modulation unit interposed therein, said unit comprising two substantially parallel conductors disposed transversely within said path and each extending in both directions through the conductive boundary, an external shielded tuner and a non-linear impedance element connected to each extremity of said conductors, and two conductors disposed transversely within said path and connected respectively to said parallel conductors.

12. A combination comprising a conductively bounded chamber and including polarization-selective means for admitting to said chamber electromagnetic waves having one state of polarization while reflecting waves having another state of polarization, polarization-selective means spaced from said first-mentioned means for admitting to or taking from said chamber waves having said other state of polarization while reflecting waves having said one state of polarization, and a balanced modulation circuit having a pair of conjugate circuit portions each coupled within said chamber with a respective one of the said waves that differ in state of polarization and each spaced from the polarization-selective means that reflects the said respective waves with which it is coupled.

13. A combination comprising a hollow conductively bounded passage adapted to support high frequency electromagnetic waves therein, a modulation circuit including at least a pair of non-linear impedance elements connected in a bridge network, said circuit comprising a pair of conjugate circuit portions, means including one of said circuit portions for impressing high frequency currents on said impedance elements, said last-mentioned means providing excitation for corresponding high frequency waves having a first state of polarization in said passage, the other of said circuit portions being disposed in coupling relation to said passage with respect to high frequency waves having a second state of polarization, the cross-section of said passage being so constricted as to preclude transmission therein of said waves having said first state of polarization, and means spaced from said other circuit portion for reflecting back upon it said waves having said other state of polarization.

14. In combination, a hollow conductively bounded passage adapted to support high frequency electromagnetic waves therein, a first substantially rectilinear conductor disposed transversely in said passage and extending in both directions through the boundary thereof, a pair of coaxial conductor tuners branching from said passage each having as its inner conductor a respective one of the extended portions of said first conductor, a second substantially rectilinear conductor disposed transversely in said passage substantially perpendicularly to said first conductor and extending from an intermediate point of said first conductor through the boundary of said passage, a pair of impedance elements interposed in said first conductor on opposite sides of said intermediate point, the cross-section of said passage adjacent said conductors being elongated and the longer dimension thereof being substantially aligned with one of said conductors.

15. A combination in accordance with claim 14 in which said impedance elements are disposed within said coaxial tuners.

16. In combination in a microwave transmission system, a hollow conductively bounded enclosure adapted to sustain high frequency electromagnetic waves therein, a bridge circuit disposed in wave coupling relation with the interior of said enclosure, said bridge circuit having a plurality of distinct circuit branches each including an impedance element and a conductor that passes through the interior of said enclosure, and tuning means individual to each of said plurality of branches.

17. In combination in a microwave transmission system, a hollow conductively bounded enclosure adapted to sustain high frequency electromagnetic waves therein, a bridge circuit disposed in wave coupling relation with the interior of said enclosure, said bridge circuit having a plurality of distinct circuit branches each including an impedance element and a conductor that extends through the boundary of said enclosure, and means individual to each of the said conductors and cooperating with the portion of each that lies outside said enclosure to form a tuned section of transmission line.

18. A combination in accordance with claim 17 in which each said last-mentioned means comprises a tubular conductor disposed coaxially of the said conductor portion, each said section of line being closed at one end and having one of said impedance elements interposed therein near said end.

19. In combination, a hollow conductively bounded chamber, a pair of tubular uniconductor microwave guides of elongated cross-section opening separately into said chamber and so oriented that a guided electromagnetic wave of dominant type in one tends to excite a guided wave of non-dominant type in the other, a modulation circuit comprising a pair of non-linear impedance elements and conductor means extending through said chamber, said conductor means connecting said impedance elements in series relation to one of said guides and in parallel relation to the other of said guides with respect to waves of dominant type in each.

20. In combination in a microwave transmission system, a hollow conductively bounded enclosure adapted to sustain high frequency electromagnetic waves therein, a pair of conductive-walled wave guides of rectangular cross-section the ends of which open into said enclosure at distinctly different points on the boundary thereof, said guides being disposed with their wider walls in mutually perpendicular planes whereby a guided wave of dominant type in either of them tends to excite a guided wave of conjugate type in the other, and a pair of wave translating devices coupled through the interior of said enclosure in series relation with respect to one of said guides and in parallel relation with respect to the other of said guides.

21. In combination, two tandem-related conductively bounded, polarization-selective electromagnetic wave guiding passages that are substantially transparent to waves having respective different predetermined states of polarization and each of which is adapted to reflect at a predetermined point waves having the said state of polarization to which the other is transparent, a branched electrical circuit including two conductor portions of which one conductor portion is oriented in energy transfer relation with said waves having a first of said different states of polarization and the other of which is oriented in energy transfer relation with said waves having a second of said different states of polarization, and a pair of variable impedance elements in respective branches of said branched circuit, said one conductor portion being spaced from the said predetermined point at which waves having said first state of polarization are reflected to maximize the energy transfer with said last-mentioned waves, and said other conductor portion being spaced likewise from the said predetermined point at which waves having said second state of polarization are reflected to maximize the energy transfer with said waves having said second state of polarization.

22. A combination in accordance with claim 21 in which said two conductor portions are spaced apart with said predetermined points of reflection lying between them and substantially coincident with each other.

23. A combination in accordance with claim 21 in which said predetermined points of reflection are spaced apart with said two conductor portions lying between them.

24. In combination, a hollow conductively bounded electromagnetic wave guiding passage, a pair of non-linear impedance elements, means for impressing electrical waves of a first high frequency on said impedance elements including a first conductor extending across said passage and connecting both of said impedance elements and a second conductor joined to said first conductor at a point between said impedance elements, said passage including an output wave guiding section adapted to freely transmit waves of a second high frequency generated by the non-linearity of said impedance elements, said output section being constricted to substantially reject said impressed waves, and reflector means in said passage spaced from said junction point on the side thereof opposite said output section for enhancing the delivery of said generated waves to said output section.

25. A combination in accordance with claim 24 including a pair of tuned sections of shielded transmission line connected to respective opposite extremities of said first conductor.

26. In a system of the kind described, a modulation unit comprising a section of hollow pipe guide, a pair of conductors extending transversely within said guide in the same transverse plane, said conductors being substantially parallel to each other over at least a part of their length, and respective non-linear elements connected to said conductors externally of said guide.

27. A combination in accordance with claim 26 comprising four tuners external of said guide, said tuners being connected respectively to the four ends of said pairs of conductors.

28. In combination, a conductively bounded electromagnetic wave guiding passage, an electrical circuit coupled in energy transfer relation with said passage with respect to guided waves of a first frequency having a predetermined state of polarization in said passage, means for impressing waves of a second frequency on said circuit, said circuit including a plurality of conductor portions disposed transversely in said passage and each carrying currents of both said frequencies, said conductor portions being so differently oriented with regard to the relative phases of the said currents carried thereby that the tendency of one of said conductor portions to excite waves in said passage having said predetermined state of polarization and said second frequency is substantially neutralized by the tendency of another of said conductor portions to excite such waves in phase opposing relation thereto, and a wave reflector spaced from said conductor portions to enhance said energy transfer relation.

29. In combination, a pair of tubular uniconductor wave guides having an aperture through which their interiors are connected in communicating relation with each other, said guides being adapted to transmit respective guided electromagnetic waves having mutually different states of polarization such as to minimize wave coupling of said guides by virtue of said aperture, and circuit means extending transversely through said aperture for intercoupling said guides with respect to guided waves having the said different states of polarization.

30. A combination in accordance with claim 29 including means for varying the said intercoupling of said guides.

31. In combination, a pair of uniconductor wave guides of rectangular cross-section having their corresponding wider sides in mutually perpendicular planes, a high frequency electrical circuit intercoupling said guides, said circuit comprising a conductor portion disposed in one of said guides perpendicularly to the wider sides thereof at a distance from the end of said one guide and a divided circuit portion disposed in the other of said guides, at least one pair of non-linear impedance elements connected in said divided circuit portion, and a pair of transmission line stubs connected to at least one of said circuit portions.

32. In combination, a pair of uniconductor wave guides of rectangular cross-section having an aperture through which their interiors are connected in communicating relation with each other, said guides being disposed with their respective corresponding wider sides in mutually perpendicular planes, and circuit means extending through said aperture from the interior of one of said guides to the interior of the other for intercoupling said guides with respect to waves therein having mutually perpendicular planes of polarization.

33. In combination, a pair of uniconductor wave guides of rectangular cross-section having an aperture through which their interiors are connected in communicating relation with each other, said guides being disposed with their respective corresponding wider sides in mutually perpendicular planes, circuit means extending through said aperture from the interior of one of said guides to the interior of the other for intercoupling said guides with respect to waves therein having mutually perpendicular planes of polarization, and at least one pair of current-dependent variable impedance elements connected in balanced circuit relation with said circuit means.

34. In combination, a pair of uniconductor wave guides of rectangular cross-section having an aperture through which their interiors are connected in communicating relation with each other, said guides being disposed with their respective corresponding wider sides in mutually perpendicular planes, circuit means extending through said aperture from the interior of one of said guides to the interior of the other for intercoupling said guides with respect to waves therein having mutually perpendicular planes of polarization, and at least one pair of current-dependent variable impedance elements connected in balanced circuit relation with said circuit means, said circuit means including a conductive connection that extends transversely through the interior of one of said guides at a distance from the end thereof to both wider sides thereof, and a pair of tuners connected to said conductive connection at each of said wider sides.

35. A pair of tubular uniconductor wave guides of elongated cross-section disposed end-to-end with their respective longer cross-sectional dimensions perpendicular to each other, said guides having adjacent end walls with an opening therein through which the interiors of said guides are in open communication with each other, a two-conductor transmission line disposed longitudinally of both said guides and extending through said opening, respective couplers in each said guide coupling said transmission line to the respective said guide with respect to guided waves of dominant mode therein, and at least one variable impedance element connected in circuit relation with said transmission line.

36. In combination, a conductively bounded passage including polarization-selective wave reflecting means for blocking transmission of waves having either of two different states of polarization from one portion of said passage to another, circuit means in said passage coupled to one of said portions with respect to waves having one of said states of polarization, circuit means in said passage coupled to the other of said portions with respect to waves having the other of said states of polarization, said two circuit means being spaced from said reflecting means to enhance the respective couplings, and means including a variable impedance element for intercoupling said two circuit means.

37. In a modulation system, a conductively bounded passage for the transmission of electromagnetic waves, a signal transceiver, a source of beating oscillations, said passage including polarization-selective wave reflecting means for blocking transmission of waves having either of two different states of polarization from one portion of said passage to another, means including said source for establishing in one of said portions waves having one of said states of polarization, a first circuit means in said passage for receiving said last-mentioned waves from said one portion, a second circuit means coupled to the other of said portions of said passage, with respect to waves having the other of said states of polarization, means including a current-dependent variable impedance element for intercoupling said circuit means, and means for connecting said signal transceiver to said impedance element, each of said circuit means being spaced in coupling-aiding relation from said reflecting means.

SLOAN D. ROBERTSON.

REFERENCES CITED

The following references are of record in the file of this patent:

UNITED STATES PATENTS

| Number | Name | Date |
|---|---|---|
| 2,153,728 | Southworth | Apr. 11, 1939 |

FOREIGN PATENTS

| Number | Country | Date |
|---|---|---|
| 116,110 | Australia | Nov. 19, 1942 |